United States Patent

Culbertson et al.

[11] Patent Number: 5,302,687
[45] Date of Patent: Apr. 12, 1994

[54] PREPARATION OF RESINS FROM PHENOLIC COMPOUNDS AND OXAZOLINES USING AMMONIUM OR PHOSPHONIUM SALT CATALYSTS

[75] Inventors: Billy M. Culbertson, Worthington; Omar Tiba; Gilbert M. Gynn, both of Dublin, all of Ohio

[73] Assignee: Ashland Oil, Inc., Russell, Ky.

[21] Appl. No.: 38,417

[22] Filed: Mar. 29, 1993

[51] Int. Cl.$^5$ ............ C08G 65/40; C08G 69/44; C08G 69/40
[52] U.S. Cl. ................... 528/153; 528/148; 528/149; 528/150; 528/154; 528/155; 528/158; 528/162; 528/163; 528/172; 528/208; 528/210; 528/212
[58] Field of Search ............ 528/137, 148, 149, 150, 528/153, 154, 155, 158, 162, 163, 172, 208, 210, 212; 568/11

[56] References Cited

U.S. PATENT DOCUMENTS 4,302,574  11/1981  Doorakian et al. ............ 528/89
4,430,491  2/1984   Culbertson et al. ........... 528/148
4,652,620  3/1987   Tufts et al. .................. 528/98

Primary Examiner—John Kight, III
Assistant Examiner—Richard Jones
Attorney, Agent, or Firm—Mary E. Picken

[57] ABSTRACT

A process for preparing a polymeric composition comprising reacting a mixture of at least one phenolic compound and at least one oxazoline compound in the presence of a catalytic amount of at least one ammonium salt and a tetracarbyl phosphonium salt, and optionally also in the presence of an alkyl halide is described.

10 Claims, No Drawings

PREPARATION OF RESINS FROM PHENOLIC COMPOUNDS AND OXAZOLINES USING AMMONIUM OR PHOSPHONIUM SALT CATALYSTS

This invention relates to an improved process for the production of thermoplastic and thermoset polymeric compositions by carrying out the reaction of a compound containing a plurality of oxazoline groups with at least one phenol compound containing a plurality of aromatic hydroxyl groups in the presence of a catalytic amount of at least one primary catalyst selected from the group consisting of tetrahydrocarbyl ammonium salts and tetrahydrocarbyl phosphonium salts.

The present invention is an improvement on the process for preparing interpolymers of bisoxazolines and polyphenolic compounds disclosed and claimed in U.S. Pat. No. 4,430,491 which is commonly assigned and is incorporated herein by reference. The prior art polymerization process discloses that the reaction requires about one hour to gel time and about 20 hours post curing time to prepare the desired resins. Several catalytic means for improving the rate of polymerization have been described in U.S. Pats. No. 4,613,662, 4,699,970 and 4,746,719, for instance. We now have discovered that the use of catalytic amounts of at least one member selected from the group consisting of quaternary ammonium salts and phosphonium salts, optionally also in the presence of an alkyl halide, produces a greatly increased rate of copolymerization of the bisoxazoline/phenolic mixture.

Catalysts of the type useful in the present invention have been previously used to promote the reaction of phenolic compounds with epoxy resins, see U.S. Pat. No. 4,438,254.

The use of ammonium and phosphonium salts as catalysts for the reaction between compounds containing a plurality of oxazoline groups per molecule and polyphenolic compounds to form thermoplastic and thermoset polymers has not heretofore been disclosed. We have also discovered that certain alkyl halides optionally may be used to enhance the catalytic activity of the primary catalysts of this invention.

The tetrahydrocarbyl ammonium salts of protic acids used herein as catalysts are well-known in the art and they correspond to formulae I, II, III, or IV

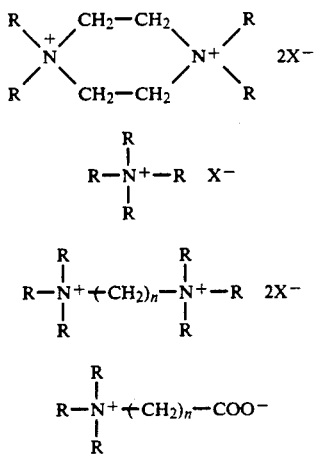

wherein R at each occurrence is independently a hydrocarbyl group or substituted hydrocarbyl group, n is an integer from 1 to 20 and X is a compatible anion. The compatible anion, X, can be any anion used in the prior art for such catalysts. Preferred as anions are halides, i.e., Br, Cl or I; carboxylates, such as formate, acetate, oxalate or trifluoroacetate; conjugate bases of weak inorganic acids, such as bicarbonate, tetrafluoroborate or biphosphate and conjugate bases of a phenol, such as phenate or an anion derived from bisphenol A. In some instances the tetrahydrocarbyl ammonium salts are complexed with the protic acid from which the anion of the phosphonium salt is derived. The ammonium salt can also be a zwitterion of formula IV, e.g., $R_3$—N—$CH_2CO_2$ and other ammonium hydroxide inner salts.

The R groups borne by the ammonium cations can be aliphatic or aromatic in character. Preferably each ammonium cation bears at least one R group which is aromatic in character, more preferably at least two such aromatic groups. Most preferably, two R groups on each ammonium cation of Compound III and three R groups on each ammonium cation of Compound II is phenyl. The compounds corresponding to formula II are preferred.

Those R groups which are not aromatic are preferably $C_1$-$C_{20}$ alkyl more preferably n-alkyl. Preferably, one R group is alkyl. The most preferred alkyl groups have from 1 to 4 carbon atoms, with methyl being especially preferred as the alkyl group.

The tetrahydocarbyl ammonium salts used herein are generally available commercially or can be prepared by methods known in the prior art.

The tetrahydrocarbyl phosphonium salts of protic acids used herein as catalysts are well-known in the art and they correspond to formulae I, II, III, or IV

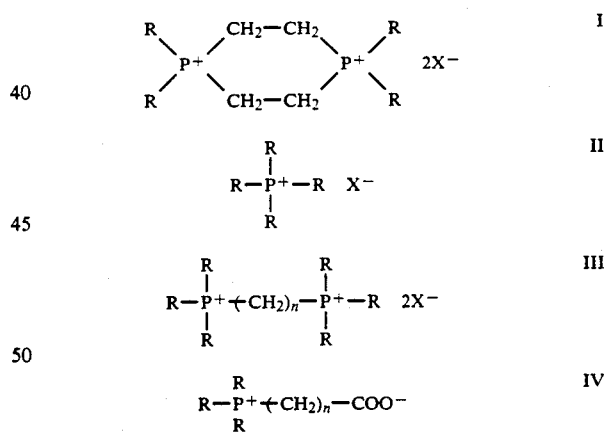

wherein R at each occurrence is independently a hydrocarbyl group or substituted hydrocarbyl group, n is an integer from 1 to 20 and X is a compatible anion. The compatible anion, X, can be any anion used in the prior art for such catalysts. Preferred as anions are halides, i.e., Br, Cl or I; carboxylates, such as formate, acetate, oxalate or trifluoroacetate; conjugate bases of weak inorganic acids, such as bicarbonate, tetrafluoroborate or biphosphate and conjugate bases of a phenol, such as phenate or an anion derived from bisphenol A. In some instances the tetrahydrocarbyl phosphonium salts are complexed with the protic acid from which the anion of the phosphonium salt is derived. The phosphonium salt can also be a zwitterion of formula IV, e.g., $R_3$—

P⁺−CH₂—CO₂⁻ and other phosphonium hydroxide inner salts described in U.S. Pat. No. 4,048,141.

The R groups borne by the phosphonium cations can be aliphatic or aromatic in character. Preferably each phosphonium cation bears at least one R group which is aromatic in character, more preferably at least two such aromatic groups. Most preferably, two R groups on each phosphonium cation of Compound III and three R groups on each phosphonium cation of Compound II is phenyl.

Those R groups which are not aromatic are preferably $C_1$-$C_{20}$ alkyl more preferably n-alkyl. Preferably, one R group is alkyl. The most preferred alkyl groups have from 1 to 4 carbon atoms, with methyl being especially preferred.

The tetrahydocarbyl phosphonium salts used herein are generally available commercially or can be prepared by methods known in the prior art. Methods for the preparation of these phosphonium salts are described in U.S. Pat. Nos. 3,477,990; 4,302,574; 4,048,141 and 4,266,079, as well as Kosolapoff et al, *Organic Phosphorus Compounds*, Vols. 1 and 2, Wiley-Interscience (1972), the relevant portions of which are incorporated herein by reference. The compounds corresponding to formula II are preferred in the present invention.

The halocarbons which are optionally useful in this invention include those conforming to at least one of Formulas I and II

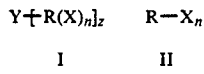

wherein Y represents an aryl, arylene and substituted aryl or arylene group having from 6 to 18 carbon atoms and wherein the substituent can be halogen, cyano, carboxylic acid, carboxylic acid ester or hydroxyl groups, R represents an aliphatic group having from 1 to 20 carbon atoms or a cycloaliphatic group having from 3 to 20 carbon atoms and wherein R can contain as substituents nitro, hydroxyl, mercapto, carboxylic acid or carboxylic acid ester groups, X represents a halogen group selected form chlorine, bromine and iodine, n represents a number of from 1 to 3 and z represents a number of from 1 to 3.

The primary catalysts are useful in the present invention in ranges of from about 0.5% to 5% by weight based on the combined weight of bisoxazoline/polyphenolic compound and preferably in the range of from about 1% to 3% by weight based on the combined weight of the bisoxazoline/polyphenolic compound.

The secondary or optional alkyl halide catalyst when employed is useful in the range of from up to about 5% and preferably in the range of from up to about 3% by weight based on the weight of combined bisoxazoline/polyphenolic compound.

The process of this invention can be carried out at temperatures in the range of from about 100 to 275° C. and preferably from about 140 to 180° C.

In preparing the thermoset polymeric compositions according to the process of this invention the preferred stoichiometry is on an equimolar basis of oxazoline to phenolic compound. Suitable stoichiometry ratios in the preparation of the polymers according to this invention involve the use of an equivalent of the bisoxazoline compound per equivalent of the phenolic reactant but the equivalent ratio of oxazoline groups to phenolic groups can be varied from 0.5 to 3.

The bisoxazoline compounds useful in the practice of this invention include a variety of such compounds having at least two 2-oxazoline groups per molecule. These bisoxazolines must be devoid of other functional groups capable of reacting in any manner with either an oxazoline group or an aromatic hydroxyl group. The oxazolines derived from polycarboxylic acids, for instance, can be used in this invention. Such polycarboxylic acids include the aromatic acids; e.g., isophthalic acid, terephthalic acid, 5-t-butylisophthalic acid, trimesic acid, trimethyl-3-phenylindan-4,1,4-dicarboxylic acid and 2,6-naphthalene dicarboxcylic acid. The polyfunctional oxazoline compounds useful in this invention can be conveniently prepared by the reaction of the corresponding esters of a polyacid and ethanolamines.

Specific oxazolines useful in the practice of this invention include particularly the bisoxazolines such as 4,4',5,5'-tetrahydro-2,2'bisoxazole, 2,2'-bis(2-oxazoline); a 2,2'-(alkanediyl) bis [4,4-dihydrooxazole], e.g., 2,2'-(2,4-butanediyl) bis [4,5-dihydrooxazole] and 2,2'-(1,2-ethanediyl) bis [4,5-dihydrooxazole]; a 2,2'-(arylene) bis [4,5-dihydrooxazole]; e.g. 2,2'-(1,4-phenylene)bis (4,5-dihydrooxazole], 2,2'-(1,5-naphthalenyl) bis (4,5-dihydrooxazole], 2,2'-(1,3-phenylene) bis [4,5-dihydrooxazole), and 2,2'-(1,8-anthracenyl) bis [4,5-dihydrooxazole; a sulfonyl, oxy, thio or alkylene bis 2-(arylene) [4,5-dihydrooxazole, e.g. sulfonyl bis 2-(1,4-phenylene) [4,5-dihydrooxazole], thio bis 2,2'-(1,4-phenylene) [4,5-dihydrooxazole] and methylene bis 2,2'-(1,4-phenylene) [4,5-dihydrooxazole]; a 2,2',2''-(1,3,5-arylene) tris [4,5-dihydrooxazole], e.g., 2,2',2''-tris (4,5-dihydrooxazole]1,3,5-benzene; a poly [(2-alkenyl) 4,5-hydrooxazole], e.g., poly[2-(2-propenyl)4,5-dihydrooxazole], and others and mixtures thereof.

Other bisoxazolines and compounds containing more than one oxazoline functional group per molecule such as those disclosed in U.S. Pat. No. 4,806,267, which is incorporated herein by reference, can be used in accordance with this invention.

The polyphenolic compounds useful in this invention include at least one of those compounds having two or more aromatic hydroxyl groups per molecule and these compounds include bisphenols, various benzene and fused aromatic ring diols and triols, e.g., 1,4-benzene diol (hydroquinone), 1,3-benzene diol (resorcinol), 1,4-naphthalene diol and 1,3,5-benzene triol; the biphenyl diols, e.g., [1,'-biphenyl]-2,2'-diol; the alkylene and cycloalkene bisphenols, e.g., 2,2'-methylene bisphenol, 4,4'-(1-methylethylidene) bisphenol (Bisphenol A), 4,4'-(phenylmethylene bisphenol), 4,4'-(cyclohexanediyl) bisphenol, 4,4'-(1,2-diethyl-1,2-ethendiyl) bisphenol and 3,4-bis(4-hydroxyphenyl)-2,4-hexadiene; the arylene bisphenols, e.g., 4,4'-phenylene bisphenol; the oxy, thio and sulfonyl bisphenols, e.g., 2,3-oxybisphenol, 4,4'-thiobisphenol and 2,2'-sulfonyl bisphenol; the bis (hydroxyaryl) alkanones, e.g., bis (4-hydroxyphenyl) methanone, 1,5-dihydroxy-9,10-anthracenedione and 4[bis(4-hydroxybenzoyloxymethyl]-1,3-propanediyl-4-hydroxybenzoate, bis(4-hydroxy benzoate)-1,2-ethanediyl; 2-(4-hydroxy benzoate) ethyl ether, bis (4-hydroxy benzamide)1,6-hexanediyl and bis (4-hydroxy benzamide)-1,4-benzenediyl.

The oxazoline compounds and mixtures thereof and polyphenolic compounds and mixtures thereof useful in this invention can also contain substituent groups which do not react with either phenols or oxazolines and such substituent groups include alkyl, aryl, halo, cyano, nitro, alkoxy, aryloxy alkyl sulfides, aryl sulfides, amine and alkyl or aryl substituted amine, amide and ester groups and the like.

In addition to the phenolic compounds and mixtures thereof noted above as being useful in this invention there are a variety of oligomers containing a plurality of phenolic residues which are also useful in this invention. Particularly representative of such oligomers are the base or acid catalyzed phenol formaldehyde condensation products, preferably the novolacs. Besides the conventional phenolics, the phenolic resins characterized in having benzylic ether linkages prepared by metal ion catalysts as disclosed in U.S. Pat. No. 3,485,797 are also useful. Other suitable polyphenol oligomers include phenol-dicyclopentadiene condensation products and the addition polymers and copolymers of a vinyl, isopropenyl and allyl substituted phenol; e.g., 4-ethenylphenol, p-isopropenylphenol, 2-allylphenol, 2-methallylphenol, and the like.

This invention is further illustrated in the following representative examples.

EXAMPLE 1

This example is given for the purpose of comparison and is outside the scope of the present invention. A mixture of 8.0 g of Alnovol PN 320 phenol-formaldehyde resin (American Hoechst, molecular weight of about 1500) and 5.3 g of 1,3-phenylene bisoxazoline was melt blended at 170° C. After about 1 hour at this temperature the viscous mixture reached the gel state. After post curing for about 20 hours at 225° C., the resulting thermoset product was found to have a Tg of 149° C. by DSC.

EXAMPLE 2

This example which is also outside the scope of the present invention shows that oxazolines are not homopolymerized by phosphonium or ammonium salts. The bisoxazoline, 1,3-phenylene bisoxazoline (10.0 g), was combined with 0.2 g of benzyltrimethyl-ammonium chloride (2% by weight) and heated for 1 hour at 170° C. No polymerization was observed. In a separate experiment a mixture of 10.0 g of 1,3-phenylene-bisoxazoline and 0.2 g of tetrabutylphosphonium bromide was heated for 1 hour at 170° C. Again, no polymerization was observed.

EXAMPLE 3

A melt blend of Alnovol PN 320 (12.0 g), 8.0 g of 1,3-phenylenebisoxazoline and 0.2 g (1% by weight) of tetrabutylphosphonium bromide was prepared at 170° C. The gel state was reached in 25 minutes at this temperature. Post curing for 1 hour at 225° C. gave a thermoset resin having a Tg of 153° C. by DSC. When this procedure was repeated using 2% by weight of the same catalyst the gel time was cut to 17 minutes at 170° C.

EXAMPLE 4

The procedure of example 3 was followed using tetrabutyl-phosphonium acetate at the 2% by weight level. A gel state was reached in 15 minutes at 170° C. The post cured product (1 hour at 225° C.) exhibited a Tg of 150° C. by DSC.

EXAMPLE 5

The procedure of example 3 was followed using 0.25 g (2% by weight) of benzyltrimethyl ammonium chloride as catalyst. The gel state was reached in 23 minutes at 170° C., with obtained thermoset exhibiting Tg of 151° C. by DSC.

EXAMPLE 6

A melt mixture of 8.0 g of Alnovol PN 320, 5.3 g of 1,3 phenylenebisoxazoline, 0.13 g (1% by weight) of tetrabutylphosphonium bromide and 0.13 g (1% by weight) of alpha, alpha'-dichloro-p-xylene was prepared at 170° C. The gel state was reached in 3.5 minutes with a strong exotherm which raised the temperature of the blend from 170 to 190° C. The resulting thermoset product was found to have a Tg of 157° C. by DSC.

EXAMPLE 7

The procedure of example 6 was followed using 1% by weight of tetrabutylphosphonium acetate combined with 1% by weight of methyl chloroacetate as catalyst. The gel state was reached in 12 minutes at 170° C. The resulting thermoset product was found to have a Tg of 156° C. by DSC.

EXAMPLE 8

A mixture in the melt of 5.3 g of Alnovol PN 320, (40% by weight), 8.0 g, (60% by weight) of 1,3-phenylenebisoxazoline, 0.13 g (1.0% by weight) of benzyltrimethylammonium chloride and 0.13 g (1% by weight) of alpha, alphal-dichloro-p-xylene was prepared at 170° C. The system gelled in 7.8 minutes showing a strong exotherm up to 202° C. The resulting thermoset resin was found to have no Tg (by DSC) below the decomposition point of the material.

EXAMPLE 9

This example demonstrates the effectiveness of the catalysts of this invention on formulations in which the weight ratio of bisoxazoline to polyphenolic compound was 63/37 and the polyphenolic compound was a mixture of more than one polyphenol material.

A. A mixture of 156.85 grams of Alnovol PN-320 novolac and 24.5 grams of resorcinol was prepared at a temperature in the range of 170°-175° C. and then 9.8 grams of benzyltrimethylammonium chloride was added to this mixture. The resulting molten mixture was then added to 308.85 grams of molten 1.3-phenylene bisoxazoline and the resulting mixture was cooled to room temperature. The gel time of a sample of this blend was found to be 33 minutes at 175° C. A sample of this blend was cured at 175° C. followed by two hours at 225° C. and the Tg of the resulting cured product was found to be 213° C. by diffractive scanning coulometry (DSC).

B. When procedure A of this Example was repeated except that no benzyltrimethylammonium chloride catalyst was used a mixture was obtained which had a gel time of 2 hours at 175° C. When a sample of this mixture was cured at 175° C. plus 2 hours at 225° C. the resulting cured product was found to have a Tg of 116° C. by DSC.

We claim:

1. The process for preparing a polymeric composition comprising reacting a mixture of at least one phenolic compound which contains two or more phenolic hydroxyl groups per molecule and at least one compound containing at least two oxazoline groups per molecule and devoid of other functional groups capable of reacting in any manner with either an oxazoline group or a hydroxyl group in the presence of from about 0.5% to about 5% by weight based on the combined weight of phenolic compound/oxazoline compound of at least one member selected from the group consisting of a tetrahydrocarbyl ammonium salt and a tetrahydrocarbyl phosphonium salt, and optionally in the presence of an alkyl halide.

2. The process of claim 1 carried out at a temperature in the range of from about 100° C. to about 275° C.

3. The process of claim 2 wherein the weight ratio of phenolic compound to oxazoline compound is in the range of from about 90:10 to 30:70, respectively.

4. The process of claim 3 wherein the alkyl halide is present in the range of from about 0 to 3% by weight based on the weight of combined bisoxazoline polyphenolic compound.

5. The process of claim 4 wherein the oxazoline compound is 1,3-phenylene bisoxazoline, the phenolic compound is a phenol-formaldehyde condensation product and the tetrahydrocarbyl ammonium salt is benzyltrimethyl ammonium chloride.

6. The process of claim 5 wherein the tetrahydrocarbyl phosphonium salt is tetrabutyl phosphonium bromide.

7. The process of claim 4 wherein the oxazoline compound is 1,3-phenylene bisoxazoline, the phenolic compound is a mixture of resorcinol and a phenolformaldehyde condensation product and the tetrahydrocarbyl salt is benzyltrimethyl ammonium chloride.

8. The process of claim 4 wherein the tetrahydrocarbyl phosphonium salt is tetrabutyl phosphonium acetate.

9. The process of claim 4 wherein the alkyl halide is alpha,alpha'-dichloro-p-xylene.

10. The process of claim 4 wherein the alkyl halide is methyl chloroacetate.

* * * * *